(12) United States Patent
Capka et al.

(10) Patent No.: US 8,274,195 B2
(45) Date of Patent: Sep. 25, 2012

(54) BEARING CONCEPT FOR SEGMENT MOTORS

(75) Inventors: Markus Capka, Schlehdorf (DE); Zeljko Jajtic, München (DE); Gerhard Matscheko, Starnberg (DE); Christian Volmert, München (DE)

(73) Assignee: Siemens Aktiengesellschaft, München (DE)

( * ) Notice: Subject to any disclaimer, the term of this patent is extended or adjusted under 35 U.S.C. 154(b) by 128 days.

(21) Appl. No.: 12/952,793

(22) Filed: Nov. 23, 2010

(65) Prior Publication Data

US 2011/0133587 A1    Jun. 9, 2011

(30) Foreign Application Priority Data

Nov. 24, 2009 (DE) .......................... 10 2009 054 390

(51) Int. Cl.
  *H02K 1/22*    (2006.01)
(52) U.S. Cl. .......................... 310/268; 310/90
(58) Field of Classification Search ............ 310/90, 310/90.5, 91, 112, 268
  See application file for complete search history.

(56) References Cited

U.S. PATENT DOCUMENTS

| | | | | |
|---|---|---|---|---|
| 3,796,039 A | * | 3/1974 | Lucien | 368/155 |
| 5,057,726 A | | 10/1991 | Mole et al. | |
| 5,334,899 A | * | 8/1994 | Skybyk | 310/268 |
| 5,537,810 A | | 7/1996 | Paweletz | |
| 6,768,239 B1 | * | 7/2004 | Kelecy et al. | 310/179 |
| 6,841,916 B2 | * | 1/2005 | Chiarenza | 310/254.1 |
| 6,946,967 B2 | | 9/2005 | Klaus et al. | |
| 7,057,312 B2 | | 6/2006 | Hodzic et al. | |
| 7,271,509 B2 | | 9/2007 | Hoppe et al. | |
| 7,332,839 B2 | | 2/2008 | Jajtic et al. | |
| 7,556,112 B2 | * | 7/2009 | Suzuki et al. | 180/65.51 |
| 7,638,916 B2 | | 12/2009 | Hoppe et al. | |
| 7,679,226 B2 | | 3/2010 | Jajtic et al. | |
| 7,737,597 B2 | | 6/2010 | Jajtic et al. | |
| 7,746,064 B2 | | 6/2010 | Knorr et al. | |
| 7,800,256 B2 | | 9/2010 | Jajtic et al. | |
| 7,834,489 B2 | | 11/2010 | Matscheko et al. | |
| 7,859,142 B2 | | 12/2010 | Armeit et al. | |
| 7,859,143 B2 | | 12/2010 | Jajtic et al. | |
| 7,863,782 B2 | | 1/2011 | Matscheko et al. | |
| 7,872,393 B2 | * | 1/2011 | Okazaki et al. | 310/268 |
| 7,893,569 B2 | | 2/2011 | Jajtic et al. | |

(Continued)

FOREIGN PATENT DOCUMENTS

DE    43 42 582 A1    6/1995

(Continued)

*Primary Examiner* — Thanh Lam
(74) *Attorney, Agent, or Firm* — Henry M. Feiereisen LLC

(57) ABSTRACT

An electrical machine includes a stator coupled to a machine frame and constructed to produce a magnetic field. A rotor which is connected to a shaft magnetically interacts with the stator and is separated there from by an air gap which is arranged such that the magnetic field within the air gap is directed essentially parallel to the shaft axis during operation of the electrical machine. Arranged between the rotor and the stator is an axial bearing which absorbs attraction forces acting between the stator and the rotor in a direction of the shaft axis. An elastic coupling mechanically couples the stator to the machine frame and is made less stiff than the axial bearing with respect to a force acting in the direction of the shaft axis, and constructed such that a force acting on the rotor in the direction of the shaft axis is able to cause the stator to be translated with respect to the machine frame in the direction of the shaft axis.

8 Claims, 3 Drawing Sheets

U.S. PATENT DOCUMENTS

| | | | |
|---|---|---|---|
| 8,110,955 B2 * | 2/2012 | Ries | 310/90.5 |
| 2007/0278865 A1 | 12/2007 | Matscheko | |
| 2008/0001488 A1 * | 1/2008 | Pyrhonen et al. | 310/60 R |
| 2008/0185932 A1 | 8/2008 | Jajtic et al. | |
| 2008/0190732 A1 | 8/2008 | Matscheko et al. | |
| 2008/0246466 A1 | 10/2008 | Jajtic et al. | |
| 2009/0174266 A1 | 7/2009 | Jajtic et al. | |
| 2009/0179505 A1 | 7/2009 | Hoppe et al. | |
| 2009/0206682 A1 | 8/2009 | Jajtic | |
| 2009/0206684 A1 | 8/2009 | Jajtic et al. | |
| 2009/0256428 A1 | 10/2009 | Jajtic et al. | |
| 2009/0258770 A1 | 10/2009 | Jajtic et al. | |
| 2009/0284104 A1 | 11/2009 | Knorr et al. | |
| 2009/0322162 A1 | 12/2009 | Jajtic et al. | |
| 2010/0026104 A1 | 2/2010 | Jajtic et al. | |
| 2010/0040448 A1 | 2/2010 | Knorr et al. | |
| 2010/0083851 A1 | 4/2010 | Matscheko et al. | |
| 2010/0231059 A1 | 9/2010 | Matscheko | |
| 2010/0301684 A1 | 12/2010 | Matscheko et al. | |

FOREIGN PATENT DOCUMENTS

| | | |
|---|---|---|
| EP | 0 495 872 B1 | 4/1994 |
| WO | WO 2008 098867 A1 | 8/2008 |

* cited by examiner

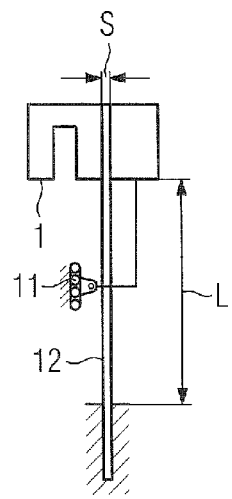
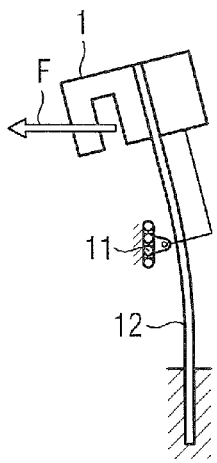
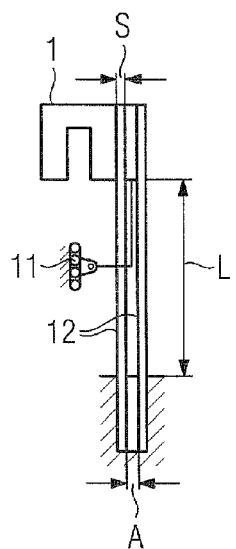
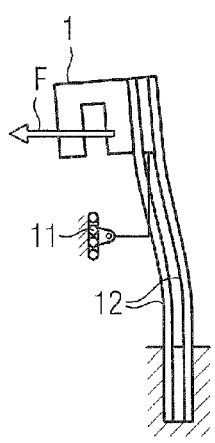
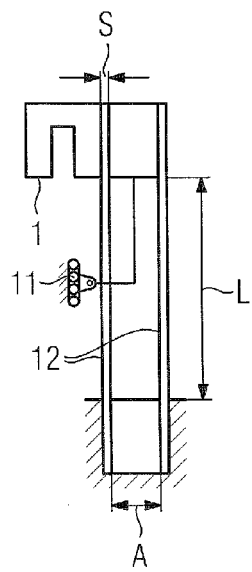
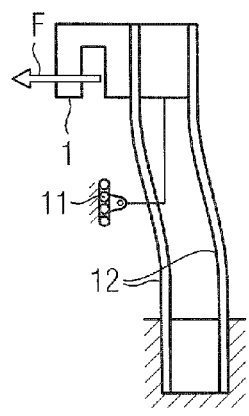

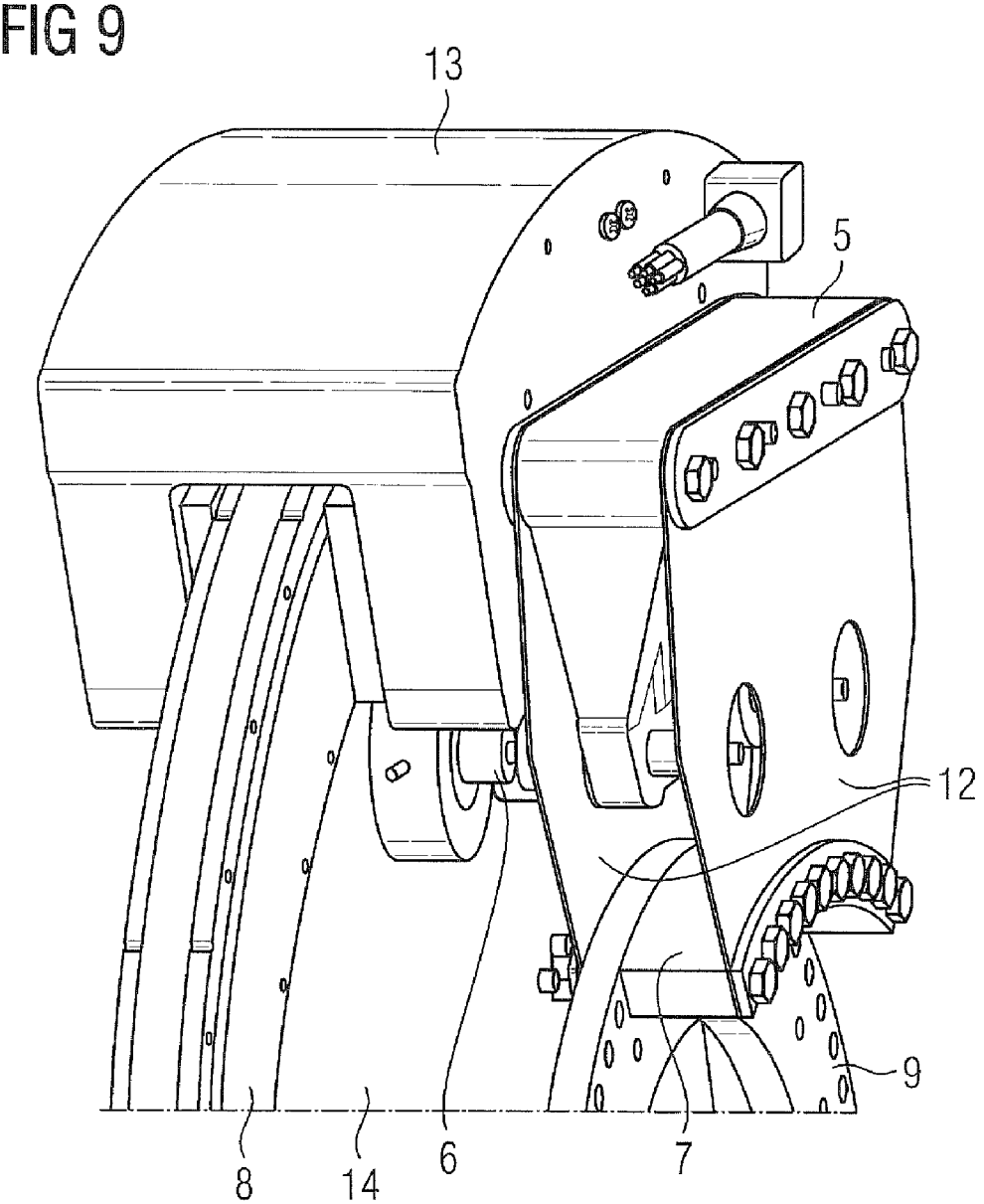

BEARING CONCEPT FOR SEGMENT MOTORS

CROSS-REFERENCES TO RELATED APPLICATIONS

This application claims the priority of German Patent Application, Serial No. 10 2009 054 390.2, filed Nov. 24, 2009, pursuant to 35 U.S.C. 119(a)-(d), the content of which is incorporated herein by reference in its entirety as if fully set forth herein.

BACKGROUND OF THE INVENTION

The present invention relates to an electrical machine.

The following discussion of related art is provided to assist the reader in understanding the advantages of the invention, and is not to be construed as an admission that this related art is prior art to this invention.

International publication WO 2008/098867 A1 discloses an electrical machine in the form of a so-called disk segment motor. The functional principle of a disk segment motors is that of linear motors, in which coils on the stator side are attached to the machine in order to produce a magnetic field, and permanent magnets are distributed on a rotating disk, in order to produce an excitation field. The drive operates on the same principle as that of a linear motor, in which the drive path is in the form of a circle, following the circumference of the rotating disk. Disk segment motors of this type have been used to produce very high torques. However, their design is not trivial since very strong magnetic attraction forces act between the stator-side laminated core and the permanent magnets on the rotor side. These become greater the smaller the air gap between the stator and rotor is chosen to be. However, in order to achieve a high machine efficiency, the air gap should be chosen to be as small as possible. To cope with the resultant strong axially acting attraction forces, the electrical machine should be made very stiff. Furthermore, in order to maintain the air gap, manufacturing tolerances for the shaft bearings must be kept correspondingly tight. The greater the torque to be produced by the electrical machine, the greater the diameter of the rotor disk must be chosen to be. However, this means that the attraction forces between the stator and rotor produce large tilting torques, corresponding to their lever arm, and these are passed into the machine frame via the shaft bearing.

The invention is based on the object of simplifying the design of an electrical machine having an air-gap field which is predominantly in the direction of the shaft axis.

It would therefore be desirable and advantageous to provide an improved electrical machine which obviates prior art shortcomings and is simple in structure while being reliable in operation and which has an air-gap field which is predominantly in the direction of the shaft axis.

SUMMARY OF THE INVENTION

According to one aspect of the present invention, an electrical machine includes a machine frame, a first stator coupled to the machine frame and having first means for producing a magnetic field, a shaft defining a shaft axis, a rotor connected to the shaft, with the rotor magnetically interacting with the first stator and being separated from the first stator by a first air gap, wherein the air gap is arranged such that the magnetic field within the first air gap is directed essentially parallel to the shaft axis during operation of the electrical machine, an axial bearing arranged between the rotor and the first stator to absorb attraction forces which act between the first stator and the rotor in a direction of the shaft axis, and an elastic coupling mechanically coupling the first stator to the machine frame, with the coupling being constructed less stiff than a stiffness of the axial bearing with respect to a force acting in the direction of the shaft axis, and constructed such that a force acting on the rotor in the direction of the shaft axis is able to cause the first stator to be translated with respect to the machine frame in the direction of the shaft axis.

In contrast to convention bearing concepts, in which the axial attraction forces are absorbed by the radial bearings of the shaft which is connected to the rotor, the axial bearings according to the invention absorb the magnetic attraction forces between the rotor and the stator as close as possible to the point of origin. In this case, the closer the bearing is placed in the area of the components which produce the magnetic field, the less are the tilting torques caused by the attraction forces and acting on the shaft. This makes it possible to considerably reduce the load on the radial bearings for the shaft.

The axial bearing which is used to maintain the air-gap field between the rotor and stator is, according to the invention, designed to be very stiff. This ensures that the optimum air gap is also always maintained when subject to mechanical loading. The axial attraction forces between the rotor and stator generally include undesirable alternating components which are caused, for example, by tumbling movements of the disk or tolerances in the manufacture of the motor. The axial bearing must therefore be very stiff, in order to withstand these forces.

If the stator were now also to be stiffly connected to the machine frame, the axial forces would be transmitted via the axial bearing to the stator, and from there on into the electrical machine. Furthermore, this would result in the problem of mechanical overdefinition of the bearing for the rotor with respect to the stator.

The invention is now based on the recognition that this mechanical overdefinition and the undesirable force transmission associated with it can be avoided by elastic coupling of the stator to the machine frame. According to the invention, this elastic coupling allows an essentially purely translational movement of the stator in the direction of the axially acting attraction forces. This elastic coupling decreases the problems associated with the assembly of the electrical machine resulting from manufacturing tolerances, in particular with respect to the alignment of the stator and rotor with respect to one another, since the stator is no longer stiffly connected to the machine frame, as in the prior art, but has the necessary flexibility in the axial direction to decouple the axial forces from the machine frame. In contrast, the coupling in the tangential direction, that is to say in the power direction of the motor, is preferably designed to be very stiff. This ensures optimum power transmission.

Furthermore, according to the invention, the coupling are designed such that the force acting in the direction of the shaft axis leads to the stator being translated with respect to the machine frame in the direction of the shaft axis. During installation of the motor, assembly tolerances therefore result only in the stator being moved parallel to the shaft axis. The air gap between the stator and the rotor remains essentially constant. This prevents any tilting movement between the stator and the rotor, since the movement of the stator is essentially purely translational, because of the design according to the invention. This would not be the case if the coupling were designed such that the axial forces caused tilting of the stator. If the stator were to be coupled to the machine housing such that an axially acting force tilted the motor suspension, then this would result in non-uniform air gaps, which would have a negative effect on the operating behavior of the motor. This is prevented by the coupling according to the invention of the stator to the machine frame.

According to another advantageous feature of the present invention, the first stator may be constructed in the form of stator disk and the rotor may be constructed in the form of a rotor disk, with the first means of the first stator being coils which are distributed in an annular shape over the stator disk. As a result of the axial bearing according to the invention, there is no need to design a rotor disk to be so inflexible as would be the case with a prior art disk motors. This makes it possible to considerably reduce the rotational inertia of this rotor disk, leading to the electrical machine having a better dynamic response.

According to another advantageous feature of the present invention, there is no need for an electrical supply to the rotor and no need for the sliding contacts associated with this, because the rotor has second means for production of a magnetic field, which in particular are in the form of permanent magnets and are arranged in an annular shape over the rotor disk. During operation of the electrical machine, the axially acting attraction forces in a refinement such as this are created between the permanent magnets on the rotor side and the stator laminated core. The bearing for absorbing the axial forces should be arranged as close as possible to the coils and permanent magnets, when considered in the radial direction, in order to reduce the production of tilting moments.

The elasticity according to the invention of the coupling of the stator to the machine frame in the direction of the shaft axis can be achieved in accordance with another advantageous feature of the present invention, when constructing the elastic coupling with two metal sheets which are arranged parallel to one another and parallel to the stator, and are separated from one another. The elasticity of the coupling in the direction of the shaft axis is governed essentially by the geometric parameters of these metal sheets, and their arrangement with respect to one another. The thicker the metal sheets are made, the stiffer is the response of the coupling in the axial direction. As the extent of the metal sheets increases parallel to the stator, that is to say at right angles to the shaft axis, the elasticity increases. A greater distance between the metal sheets makes it easier for the stator to move in the desired direction, i.e. translationally and parallel to the shaft axis.

According to another advantageous feature of the present invention, the bearing may be constructed in the form of a roller bearing or journal bearing in which case, if it is in the form of a journal bearing, this may be, for example, an air bearing, magnetic bearing, hydrostatic bearing or dry bearing.

An increase in the torque which can be produced by the electrical machine and a reduction in the load on the bearing are achieved in accordance with another advantageous feature of the present invention, by providing the electrical machine with a second stator with first means for production of a magnetic field, wherein the rotor is arranged between the first stator and the second stator such that the rotor is separated from the second stator by a second air gap, wherein the magnetic field produced by the first means of the second stator is directed essentially axially within the second air gap during operation of the electrical machine.

In order to guarantee a defined direction of the attraction forces so as to maintain stability of the overall system, the attraction forces acting between the first stator and the rotor are greater than the attraction forces acting between the second stator and the rotor. By way of example, this aim can be achieved by passing a current with less magnitude through the coils of the second stator than those of the first stator. Alternatively, when permanent magnets are used to produce the excitation field, on the rotor, permanent magnets of different strengths can be used for the two air-gap fields. The simplest possibility for production of an imbalance between the attraction forces can be realized by sizing the air gap between the first stator and the rotor smaller than the air gap between the second stator and the rotor.

In particular, when the electrical machine makes use of the functional principle of linear motor technology, the efficiency of the motor is directly dependent on the air gap which can be produced between the rotor and the stator. The efficiency of the electrical machine is therefore extremely dependent on the compliance with the dimensions, stiffness and bearing of the rotor, and on the quality of the alignment between the stator and the rotor.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 shows a first elastic coupling of a stator to a machine frame, FIG. 4 shows a schematic illustration of a first elastic coupling of the stator to the machine frame under the influence of axially directed forces, FIG. 5 shows a schematic illustration of a second elastic coupling of the stator to a machine frame, FIG. 6 shows a schematic illustration of the second elastic coupling of the stator to the machine frame under the influence of axially directed forces, FIG. 7 shows a schematic illustration of an elastic coupling of the stator to a machine frame according to one embodiment of the invention, FIG. 8 shows a schematic illustration of the elastic coupling of the stator to the machine frame as shown in FIG. 7, under the influence of axially directed forces, and FIG. 9 shows a perspective illustration of a stator, attached to a machine flange, of another embodiment of an electrical machine according to the present invention.

DETAILED DESCRIPTION OF PREFERRED EMBODIMENTS

Figure 1:
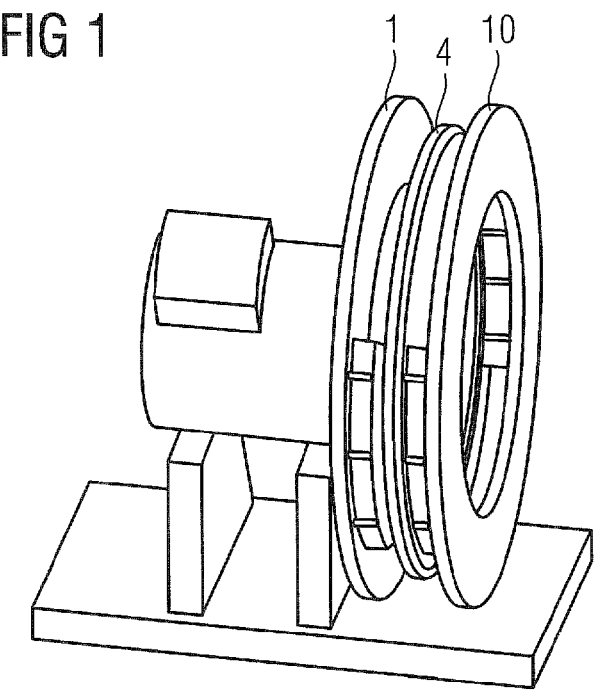
FIG. 1 shows a perspective illustration of one embodiment of an electrical machine in the form of a segment motor in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of one embodiment of an electrical machine in the form of a segment motor. In principle, a segment motor such as this can be considered to be a linear motor arranged in a circular shape. The machine comprises a rotor 4 which is arranged between a stator 1 and a further stator 10. Permanent magnets arranged in an annular shape are located on the rotor 4, in order to produce an excitation field. The permanent magnets are arranged on both sides of the rotor 4, as a result of which both the stator 1 and the further stator 10 can transmit a torque to the rotor 4. Coils are in each case fitted both on the stator 1 and on the further stator 10, and are used to produce an armature field. The coils of the two primary parts, that is to say of the stator 1 and of the further stator 10, are each separated via an air gap from the permanent magnets of the secondary part, that is to say of the rotor 4.

Because of the large diameter which can be achieved with a disk arrangement such as this, a segment motor such as this can produce a very high torque. The magnetic lines of force run within the air gap between the stator 1 and the rotor 4, and within the further air gap between the rotor 4 and the further stator 10 in the axial direction, that is to say in a direction parallel to the rotation axis of the rotor 4. Attraction forces which act between the rotor 4 and the stator 1, and between the rotor 4 and the further stator 10, are likewise directed axially, i.e. parallel to the shaft axis of a shaft 3 of the electrical machine. The attraction forces which act between the wound laminated cores of the stators 1, 10 and the permanent magnets generally have different magnitudes, thus making it possible to also produce strong resultant axial forces and tilting movements, in addition to the torque of the segment motor. In order to allow these to be coped with according to the prior art, the elements of a segment motor such as this, in particular the rotor 4, are in general designed to be very inflexible. However, this in general results in the rotor disk being very heavy and therefore having high inertia.

Figure 2:
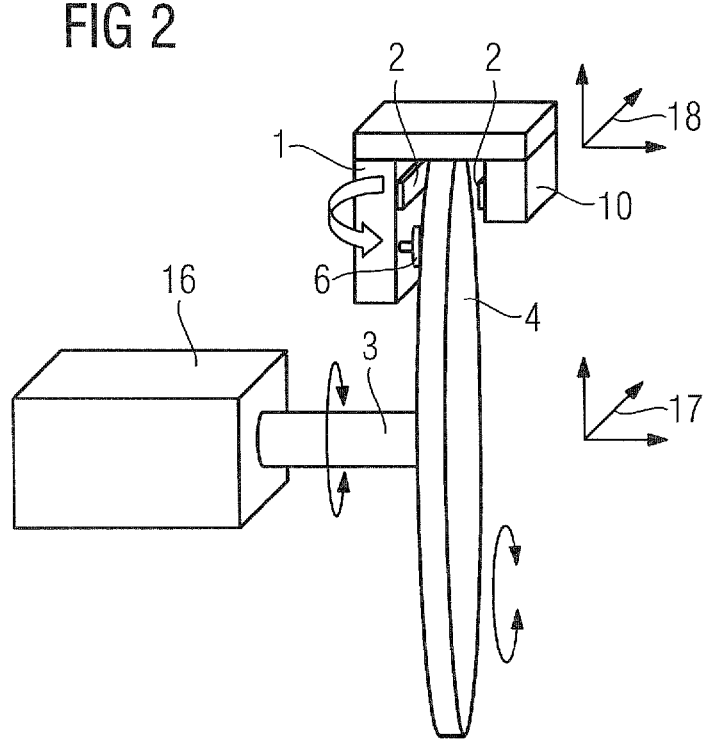
FIG. 2 shows a basic design of an electrical machine in the form of a disk arrangement with an axial bearing.

FIG. 2 shows a basic design of an electrical machine in the form of a disk arrangement with an axial bearing 6. In this case as well, the electrical machine, which is in the form of a disk motor, comprises a rotor 4 in the form of a disk, which is arranged between a stator 1 and a further (second) stator 10. The axial bearing 6 is arranged between the stator 1 and the rotor 4 and can absorb the attraction forces which act axially between the laminated core of the stator 1 and the permanent magnets of the rotor 4. This bearing 6 may be either in the form of a roller bearing or a journal bearing. If it is a journal bearing, hydrostatic bearings, dry bearings or air bearings may be used. This bearing makes it possible to prevent the rotor disk from also having to transmit axial forces or tilting movements, in addition to the motor torque. This results in a closed power flow via the permanent magnets, the air gap, the coils 2 and the axial bearing 6, as indicated by an arrow in the FIG. 2.

The axial bearing 6 is provided between the stator 1 and the rotor 4 in order to absorb the axial attraction forces as close as possible to their point of origin. This axial guidance of the rotor 4 allows the air gap between the stator 1 and the rotor 4, and therefore also the air gap between the rotor 4 and the further stator 10, to be ensured. This illustration deliberately leaves open how the stator 1 is coupled to a housing 16 of the machine or machine frame. If the stator 1 were to be rigidly coupled to the housing 16 of the machine, the axial forces acting on the axial bearing 6 would be transmitted to the machine frame, as well. This would result in direct coupling between the primary part coordinate system 18 and the machine coordinate system 17. However, the load on the machine parts can be further reduced if the coupling between these two coordinate systems 17, 18 is broken.

FIG. 3 shows a first elastic coupling of a stator 1 to a machine frame. The machine frame is in this case and also in the further FIGS. 4 to 8 represented for simplicity by a foundation. For the sake of clarity, further elements of the electrical machine are not illustrated in FIG. 3, such as the axial bearing, the rotor and the components which produce the magnetic field. This also applies to the further FIGS. 4 to 8. FIG. 3 shows only the bearing point 11, where the rotor is borne with respect to the stator 1 by means of the axial bearing.

The stator 1 is mechanically coupled to the machine frame via a metal sheet 12 of thickness S. This metal sheet 12 is elastic in the direction of the shaft axis of the electrical machine, and can therefore be bent by axial forces which act in the air gap between the stator 1 and the rotor.

FIG. 4 shows the first elastic coupling of the stator 1 to the machine frame under the influence of axially directed forces F. An axially directed force F such as this acts in the air gap of the electrical machine which is in the form of a disk, because of the high magnetic forces between the stator 1 and the rotor. A force effect such as this can occur, for example, during the assembly of the electrical machine, while the rotor is being inserted into the stator 1 of the electrical machine. If the axially directed tensile force F that is shown now occurs, the metal sheet 12 is bent. The primary part or the stator 1 is tilted with respect to the secondary part or the rotor, and this is illustrated in exaggerated form in the FIG., in order to illustrate it better. The air gap in this case becomes non-uniform, and this has a negative effect on the operating response of the electrical machine. It is admittedly desirable to decouple the coordinate system on the primary side from the coordinate system of the machine frame, in order to prevent overdefinition of the bearing of the rotor. However, the deformation of the metal sheet 12 required for this purpose should not lead to a change in the position of the rotor with respect to the stator 1, in particular in the area of the air-gap field.

FIG. 5 shows a second elastic coupling of the stator 1 to a machine frame. In this case, the coupling is provided by two metal sheets 12 which are arranged parallel to one another. These are in turn parallel to the stator 1, which is likewise in the form of a disk, and its rotor, which is likewise in the form of a disk. The metal sheets 12 have a sheet-metal thickness S and are separated from one another by a distance A.

FIG. 6 shows the second elastic coupling of the stator 1 to the machine frame under the influence of axially directed forces F. A comparison with FIG. 4 shows that the relative movement of the stator 1 with respect to the machine frame is now formed by a translational movement in addition to the tilting movement. This is because of the use of two metal sheets 12, which are at a distance from one another. However, in this case as well, a detectable rotary component is also evident in the movement of the stator 1 with respect to the machine frame and the rotor, and this leads to the said undesirable non-uniformity of the air gap.

FIG. 7 shows an elastic coupling of the stator 1 to a machine frame according to one embodiment of the invention. The embodiment corresponds essentially to that shown in FIG. 5 and FIG. 6, except for the difference that the distance between the metal sheets 12 is now chosen to be considerably greater.

FIG. 8 shows the elastic coupling of the stator 1 to the machine frame as shown in FIG. 7 under the influence of axially directed forces. As can clearly be seen here, the greater distance between the metal sheets 12 leads to the axially directed force F leading essentially to a purely translational movement of the stator 1. The tilting component is virtually no longer evident. Because of the refinement of the elastic coupling according to the invention, the air gap between the rotor and the stator remains virtually unchanged, thus making it possible to maintain an air gap optimized to the operating response, despite manufacturing tolerances.

FIG. 9 shows a stator 1 attached to a machine flange 9, of an electrical machine according to a further embodiment of the invention. The electrical machine comprises a secondary part disk 14, on which individual secondary part segments 8 are arranged. The secondary part segments 8 once again have permanent magnets in order to produce an excitation field. The stator comprises a plurality of primary part segments 13, which are distributed over the circumference and have the coils required to produce an armature field. The secondary part disk 14 is borne with respect to the stator of the electrical machine via an air bearing, which carries out the task of the axial bearing 6 according to the invention. Air bearings allow very high stiffness to be achieved, with only relatively low supply pressures (generally below 10 bar) being required for this purpose. The air bearing is connected via an air bearing holder 5 to two metal sheets 12 which are arranged parallel and are once again attached to a machine flange 9 of the electrical machine. A desired distance between the two metal sheets 12 is ensured by means of a spacer 7. The metal sheets 12 have the previously described elasticity, which allows parallel movement of the arrangement consisting of the primary part segments and secondary part disk, with respect to the machine flange 9 and therefore with respect to the machine frame of the electrical machine. The distance between the metal sheets 12 is chosen to be sufficiently great to allow a virtually purely translational movement, as was illustrated in FIG. 8.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electrical machine, comprising:
a machine frame;
a first stator coupled to the machine frame and having first means for producing a magnetic field;
a shaft defining a shaft axis;
a rotor connected to the shaft, said rotor magnetically interacting with the first stator and being separated from the first stator by a first air gap, wherein the air gap is arranged such that the magnetic field within the first air gap is directed essentially parallel to the shaft axis during operation of the electrical machine;
an axial bearing arranged between the rotor and the first stator to absorb attraction forces which act between the first stator and the rotor in a direction of the shaft axis; and
an elastic coupling mechanically coupling the first stator to the machine frame, said coupling being constructed less stiff than a stiffness of the axial bearing with respect to a force acting in the direction of the shaft axis, and constructed such that a force acting on the rotor in the direction of the shaft axis is able to cause the first stator to be translated with respect to the machine frame in the direction of the shaft axis.

2. The electrical machine of claim 1, wherein the first stator is constructed in the form of stator disk, said first means of the first stator being coils which are distributed in an annular shape over the stator disk.

3. The electrical machine of claim 1, wherein the rotor is constructed in the form of a rotor disk and has second means for production of a magnetic field, said second means constructed in the form of permanent magnets and arranged in an annular shape over the rotor disk.

4. The electrical machine of claim 1, wherein the elastic coupling has two metal sheets arranged in spaced-apart parallel relation to one another and to the stator.

5. The electrical machine of claim 1, wherein the axial bearing is a member selected from the group consisting of air bearing, magnetic bearing, hydrostatic bearing, and dry bearing.

6. The electrical machine of claim 1, further comprising a second stator with first means for production of a magnetic field, wherein the rotor is arranged between the first stator and the second stator such that the rotor is separated from the second stator by a second air gap, wherein the magnetic field produced by the first means of the second stator is directed essentially axially within the second air gap during operation of the electrical machine.

7. The electrical machine of claim 6, wherein the attraction forces acting between the first stator and the rotor are greater than the attraction forces acting between the second stator and the rotor.

8. The electrical machine of claim 7, wherein the first air gap between the stator and the rotor is smaller than the second air gap between the second stator and the rotor.

\* \* \* \* \*